United States Patent
Tankersley

(10) Patent No.: US 6,392,661 B1
(45) Date of Patent: May 21, 2002

(54) METHOD AND APPARATUS FOR IMPROVING SITUATIONAL AWARENESS USING MULTIPLE MAP DISPLAYS EMPLOYING PERIPHERAL RANGE BANDS

(75) Inventor: Leland James Tankersley, Silver Spring, MD (US)

(73) Assignee: Trident Systems, Inc., Fairfax, VA (US)

( * ) Notice: Subject to any disclaimer, the term of this patent is extended or adjusted under 35 U.S.C. 154(b) by 0 days.

(21) Appl. No.: 09/335,352

(22) Filed: Jun. 17, 1999

Related U.S. Application Data

(60) Provisional application No. 60/089,607, filed on Jun. 17, 1998.

(51) Int. Cl.[7] ............................................. G06T 3/40
(52) U.S. Cl. .......................... 345/660; 340/945; 701/14
(58) Field of Search ................. 340/995, 945, 340/971; 345/439, 428, 660; 701/14

(56) References Cited

U.S. PATENT DOCUMENTS 6,169,552 B1 * 1/2001 Endo et al. .................. 345/427

* cited by examiner

*Primary Examiner*—Michael Razavi
*Assistant Examiner*—Motilewa Good-Johnson
(74) *Attorney, Agent, or Firm*—Hunton & Williams

(57) ABSTRACT

An apparatus and process for arranging and presenting situational awareness information on a computer display screen using maps and/or other situational awareness information so that greater amounts of relevant information can be presented to a user within the confines of the limited area on small computer screen displays. The map display layout for a screen display utilizes multiple, independent map displays arranged on a computer screen in order to maximize situational awareness information and display that information efficiency. By displaying single or multiple maps in a plurality of range bands arranged along the peripheral area of a display screen, wasted screen area is minimized. The ability to independently scale with respect to distance, time and velocity, as well as zoom and pan each map on the screen display further improves the display presentation. When connected to a communication network, the ability of the screen display to project real time images and the movement of objects further enhances the delivery of situational awareness information to the user.

25 Claims, 10 Drawing Sheets

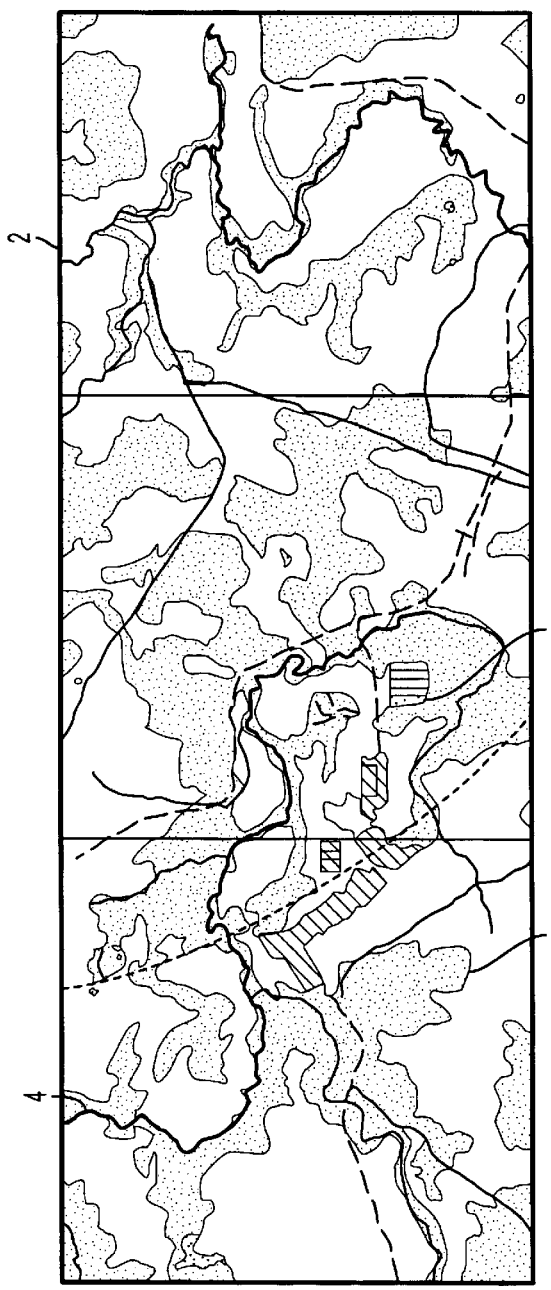
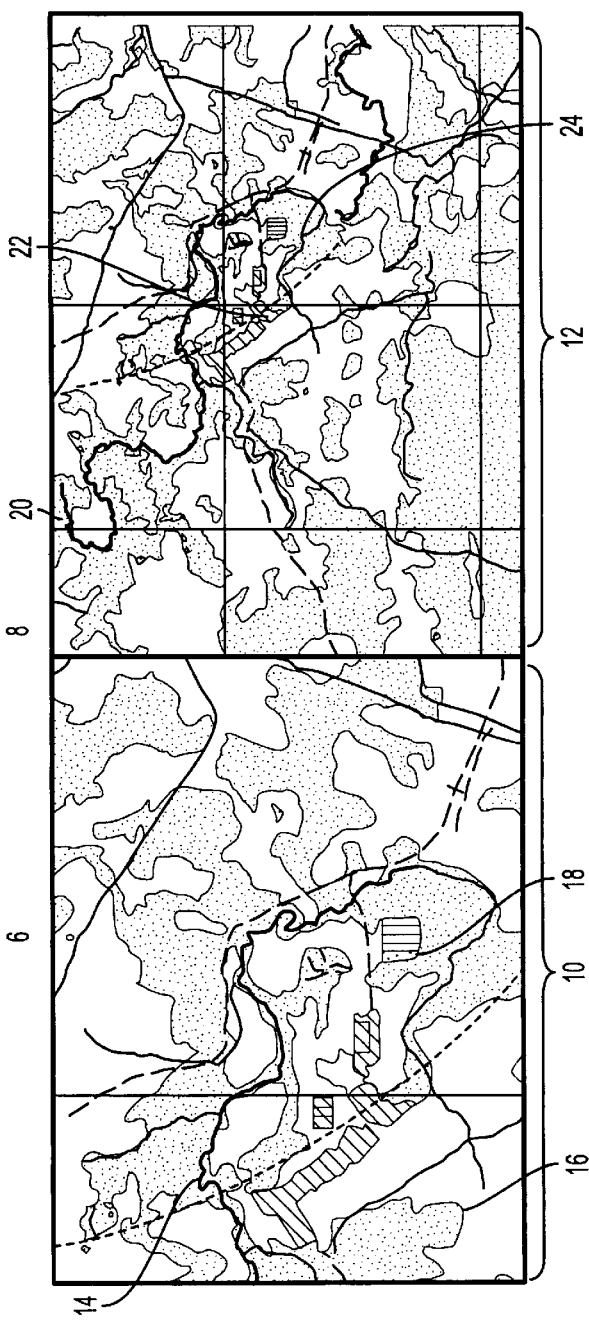
FIG. 1A (PRIOR ART)
FIG. 1B (PRIOR ART)

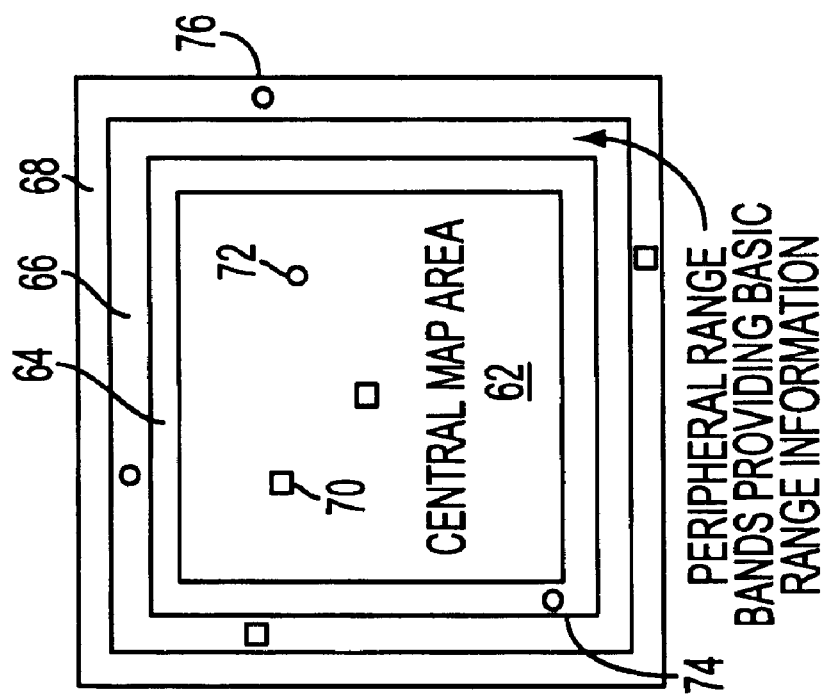
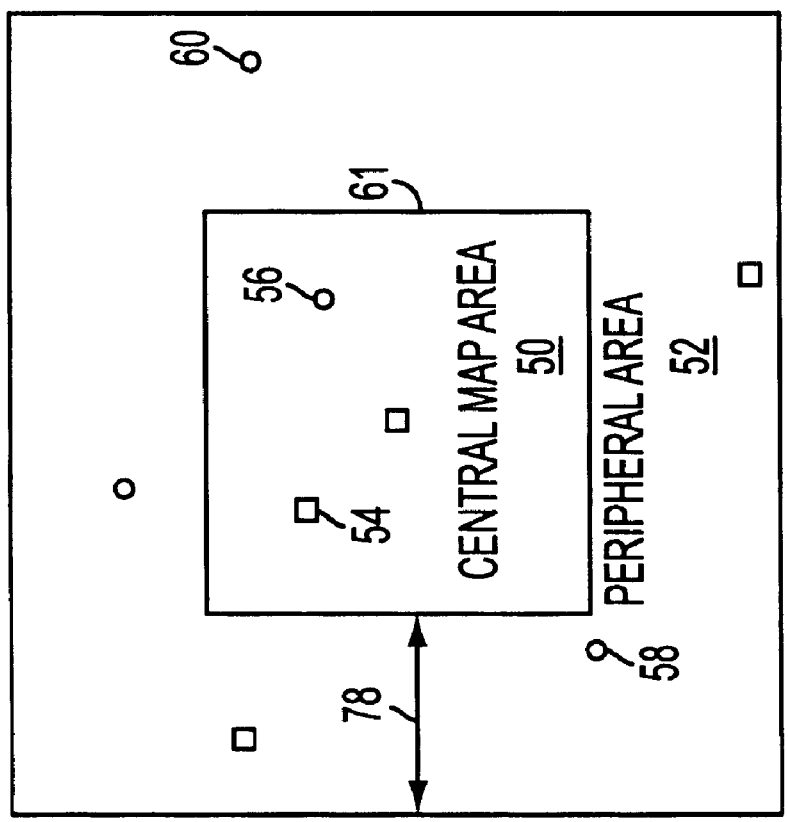
FIG. 3B
FIG. 3A

METHOD AND APPARATUS FOR IMPROVING SITUATIONAL AWARENESS USING MULTIPLE MAP DISPLAYS EMPLOYING PERIPHERAL RANGE BANDS

This application claims benefit to U.S. application Ser. No. 60/089,607, filed Jun. 17, 1998.

FIELD OF THE INVENTION

This invention relates to a method for improving the display of situational awareness information by using single or multiple map or map based displays with peripheral range bands. Range bands are map or map based areas displayed on a display screen such that varying map scale within the range band allows for greater area to be displayed.

BACKGROUND

In recent years, prior art systems of displaying situational awareness information to users have moved from physical paper maps to digital maps displayed on computers. Recent advances in processing, display, and communications capabilities have resulted in the development of lightweight handheld computers for use in displaying digital information relating to a user's situational awareness. These systems, when coupled with modem distributed information systems, including wireless network technologies and accurate positional data from sources such as the Global Positioning System (GPS), have the potential to improve a user's situational awareness in both military and civilian applications. However, the utility of these lightweight computer systems in the situational awareness domain is limited by the ability of their small display screens to depict information on a small screen display with sufficient area and detail for the user to make informed decisions.

Many small screen displays currently in use in handheld computing systems are not square, and may present aspect ratios of 2.5:1 or greater. This can result in a waste of valuable screen area, especially when situational awareness information is projected where the user requires accurate information about the entire area surrounding a location of interest. With a typical north-up display orientation, a display screen will present more information on the east-west axis than on the north-south axis. This introduces an undesirable situation and orientation dependence on the presentation of awareness information. Another problem with presenting information on small screen displays is the conflict of resolution versus area coverage. If a small screen map display depicts an area large enough for use in situational awareness applications, it may lack necessary details. Conversely, if a large scale map displays sufficient detail, it may not present enough area to provide useful situational awareness information.

A need exists for a user to obtain situational awareness information such that a variety of information can be projected on a display device such that several different scale levels of information can be projected at once. In addition, by connecting the display device to a communication network, a need exists for a real-time display of a user's situational awareness information that changes with respect to movement by the user and/or point of interest. A need also exists for displaying a variety of different types of information. For example, in a military application, a solder might need to obtain situational awareness information that dynamically changes as the position of the solder changes such that the movements of the user are displayed on a hand held display device showing terrain map images while also dynamically obtaining and displaying threat information from a wireless communication network. This threat information could be information regarding the movements of enemy air or ground based assets against the solder's position and displayed as information over a terrain map based image. In civilian applications, a user might want a display screen to project real-time information relative to the movement of the user and other rescue or police pursuit units.

SUMMARY

An apparatus and process for arranging and presenting situational awareness information on a computer display screen using maps and/or other situational awareness information so that greater amounts of relevant information can be presented to a user within the confines of the limited area on small computer screen displays. The map display layout for a screen display utilizes multiple, independent map displays arranged on a computer screen in order to maximize situational awareness information and display that information efficiency. By displaying multiple maps sharing a single display screen, wasted screen area is minimized by using map aspect ratios closer to unity. The ability to independently scale, zoom, and pan each map on a screen display further improves the display presentation. One map display area on a screen display can be used to provide large-scale, high-detail information about a specific area, while a second map display area can provide smaller-scale coverage of an area. Alternatively, the two maps can be used to provide specific information about two different areas of interest.

Use of map display layouts with peripheral range bands are methods for efficiently presenting and enhancing the user's comprehension of map-based situational awareness information. While these methods have widespread applicability to all map-based displays, they are particularly well-suited for application to handheld or palmtop computer systems and their small display screens. Using multiple map display areas with peripheral range bands reduces the waste of valuable screen area and provides a detailed view of an immediate area of concern while maintaining a moderate level of information about a wider area of interest for the user. The peripheral range bands further extend the user's situational awareness by providing general cueing information about areas outside the area of interest depicted on the map display proper.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

FIG. 1a illustrates a prior art screen display projection of a map showing areas of interest.

FIG. 1b illustrates a prior art screen display projection of two maps showing different scale areas of interest.

FIG. 3a illustrates a central map and peripheral map areas.

FIG. 3b illustrates a screen display projecting points of interest in multiple range bands located on the edge of the screen display.

DETAILED DESCRIPTION OF PREFERRED EMBODIMENTS

Figure 2B:
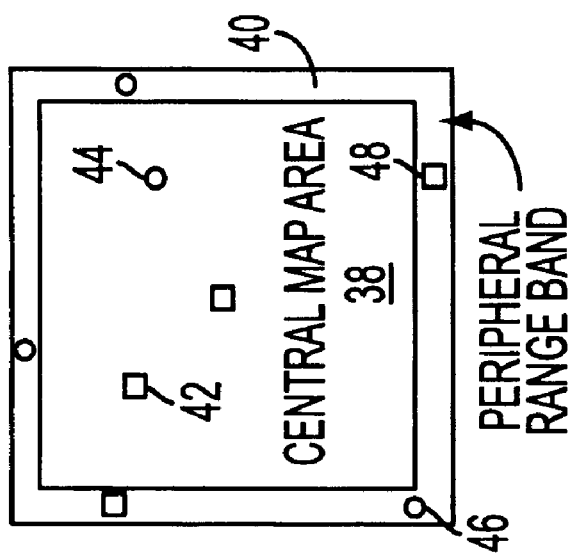
FIG. 2b illustrates a screen display projecting points of interest in a single range band located on the edge of the screen display.

FIG. 1a illustrates a prior art screen display projection of a map showing areas of interest. The displayed image 2 is projected on an oblong display screen such as the 640×240 pixel screens currently in use in some handheld computers. Points of interest such as a river 4, forest 6 or building structure 8 can be displayed on the screen display 2. FIG. 1b depicts an alternative arrangement of a dual map display layout, where two images of a map area are projected in separate screen areas on the screen display. The image 10 is a zoomed in projection of the image 2 and provides the user with greater resolution of the river 14, forest 16 and building structure 18 that was displayed in FIG. 1a. A zoomed out image 12 shows the image 10 with a greater scale of the river 20, forest 22 and building structure 24 providing less resolution but greater information of the overall situational awareness of the user.

However, one drawback of presenting multiple maps on the small screen display 2 is the loss of resolution as the display area is reduced to allow for additional map images to be projected. As additional map images are displayed, each additional map display area becomes increasingly small. To compensate for this effect, peripheral range bands can be used to enhance the user's peripheral awareness of the zone around the immediate area shown on the main map display. Peripheral range bands utilize a narrow strip of pixels around the border of a map display to provide general information about the situation outside the area depicted on the central map display. Thus, the range band effectively compresses the map display on the periphery, where less detailed information regarding the user's overall situational awareness is less important than the highly detailed information corresponding to an immediate area of concern to the user.

Figure 2A:
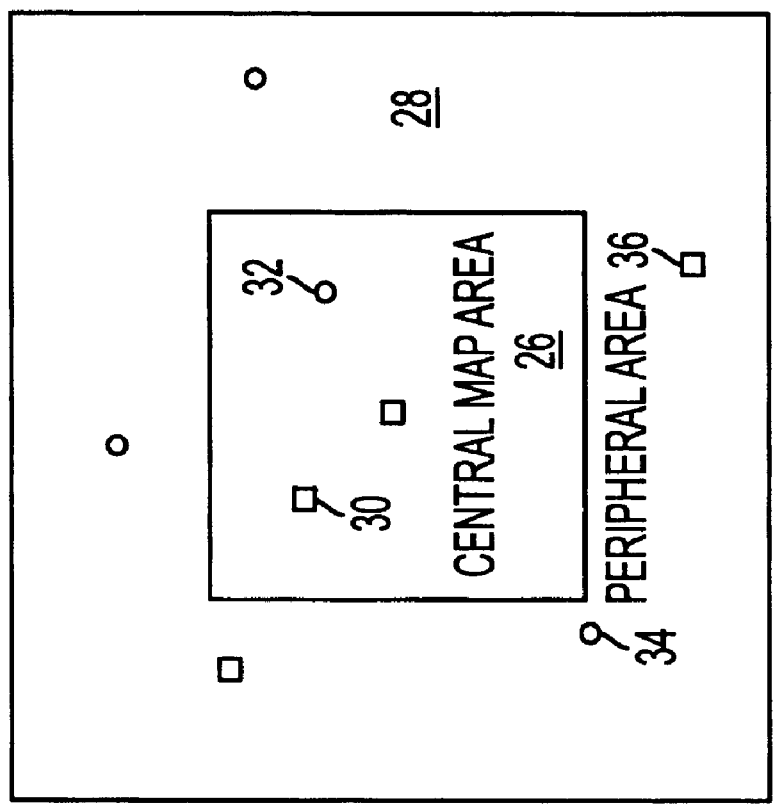
FIG. 2a illustrates a central map and peripheral map areas.

FIG. 2a illustrates an image having the same scale across the central map area 26 and peripheral map area 28. Points of interest denoted as items 30 and 32 are located in the immediate and specific area of the user and their importance for situational awareness is higher than items 34 and 36.

FIG. 2b illustrates a screen display projecting the same central map area 26 and peripheral map area 28 using two different scales to project the same image in a reduced overall area. Points of interest in the peripheral map area 28 are projected in a single range band 40 located on the edge of the screen display. The central map area 38 contains a representation of the central map area 26 of FIG. 2a. The range band 40 displays the less relevant information of the peripheral area 28 from FIG. 2a. Items of greater interest 30 and 32 from FIG. 2a are projected in the central map area 38 as items 42 and 44, respectively. Items of lesser concern and interest 34 and 36 located in the peripheral map area 28 from FIG. 2a are projected in the peripheral range band area 40 as items 46 and 48, respectively.

FIG. 3a illustrates a central map and peripheral map area with the same scale throughout the image. Using multiple peripheral range bands provides additional levels for transforming a larger area into a small screen display area. The original image in FIG. 3a shows a central map area 50 and a peripheral map area 52. The peripheral area 52 will ultimately be divided into various bands with the same or varying thicknesses, preset or user defined. Typically, the dimensions of the various peripheral bands will represent increasing thicknesses of the peripheral area 52 as the total number of peripheral range bands is increased. The highest perspective level of information comes from the peripheral range bands surrounding the smaller scale map of the central map area 50. This approach seamlessly provides more information about objects and events that occur closer to the area of interest and less information about occurrences on the periphery, while promoting efficient use of the user's limited screen display area.

In FIG. 3a, items 54 and 56 are located in the central map area and items 58 and 60 are located in the peripheral area 52. The distance from the edge 61 of the central map area 50 to items 58 and 60 will determine their respective locations in the multiple peripheral range bands projected on the screen display.

For example, FIG. 3b illustrates a screen display projecting points of interest in multiple range bands located on the outer edge of the screen display. Items 70 and 72 are located in the central map area 62 of the screen display similar to the representation of the items in the central map area described in FIGS. 3a. However, unlike FIGS. 2a and 2b where only one peripheral range band was illustrated, FIG. 3b illustrates three range bands 64, 66 and 68. The three range bands 64, 66 and 68 depict the information located in the peripheral area 52 of FIG. 3a.

The placement of items or points of interest in the respective range bands is a function of the distance of the item or points of interest from the center of the central map area 50 and the location of the item or points of interest within the peripheral area 52. The range bands 64, 66 and 68 can represent equal distance of the peripheral area 52. For example, if the peripheral area 52 of FIG. 3a has a thickness 78 of 30 kilometers, then the three range bands 64, 66 and 68 can have equal thickness scales of 10 kilometers each. An alternative arrangement, provides for increasing thickness representations. The first range band 64 could have a thickness representation of 2 kilometers of the peripheral area 52, the second range band 66 could have a thickness representation of the next 8 kilometers of the peripheral area 52, and the third range band 68, a thickness representation of the last 20 kilometers representing the total 30 kilometer thickness of the peripheral area 52.

The previous example uses traditional map based distances. An alternative embodiment to distance representations could be time scales where the screen display tracks the movement of objects with respect to time. From the center of the central map area 62, items 70 and 72 could represent positions of points of interest within a one hour time travel to the center of the central map area 62. The corresponding peripheral range bands 64, 66 and 68 could represent time increments from the center of the central map area 62, of two to twenty-four hours (one days of travel to the center of the central map area 62), twenty-four to seventy-two hours (one to three days of travel to the center of the central map area 62), and seventy-two to one hundred sixty-eight hours (three to seven days of travel to the center of the central map area 62).

A second alternative embodiment to distance and time representations could be velocity representations of items or points of interest relative to the movement of the center of the central map area 52. If the center of the central map area is moving at a velocity of 20 kilometers per hour, the screen display could project items or points of interest that are moving at velocities that differ from the velocity of the center of the central map area 62. For example, the screen display depicted in FIG. 3b, is mounted to a vehicle traveling at a velocity of twenty kilometers per hour. The central map area on the screen display projects all items traveling with a velocity between zero and twenty-five kilometers per hour. Items 70 and 72 are other vehicles traveling at the same twenty kilometers per hour and their respective position of the vehicle with the mounted screen display (denoted as the center of the central map area 62). Item 74 is located in the first range band 64 for objects traveling at a velocity of twenty-five to fifty kilometers per hour. Likewise, range bands 66 and 68 represent higher velocities. A user's ability to switch between distance, time and velocity scales assists in providing relevant information while minimizing information overload.

Figure 4:
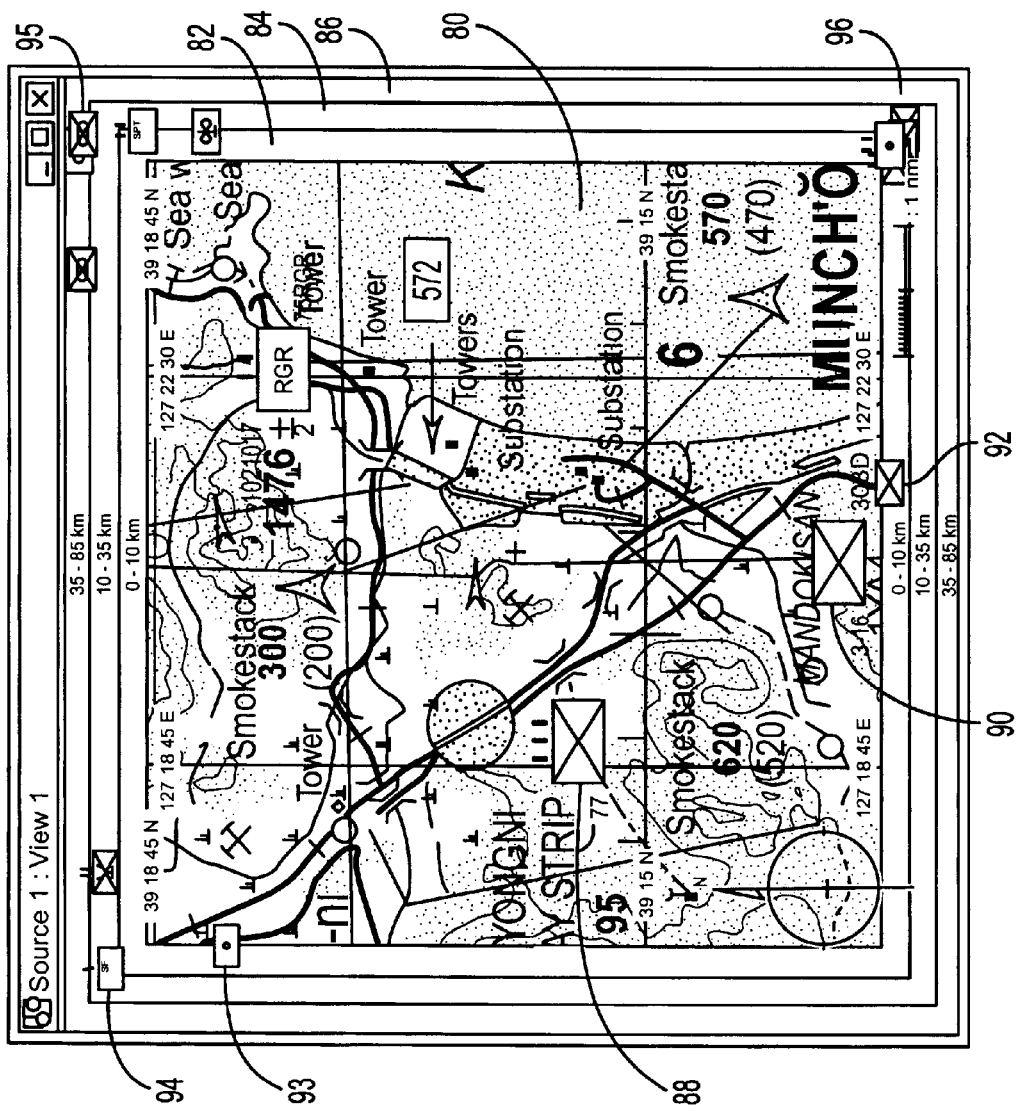
FIG. 4 illustrates a screen display of a map projecting multiple range bands according to map distances with points of interest displayed on the screen display.

FIG. 4 illustrates a screen display of a map projecting multiple range bands according to map distances with points of interest displayed on the screen display. The central map area 80 projects a map image of interest to a user. Three peripheral range bands 82, 84 and 86 project items of interest outside the image projected in the central map area 80. The first range band 82 represents items of interest within zero to ten kilometers. The second range band 84 represents items of interest within ten to thirty-five kilometers. The third range band 86 represents items of interest within thirty-five to eighty-five kilometers. In FIG. 4, the location of various military units 88 and 90 are displayed on the central map area 80. Other military units of interest 92, 93, 94, 95 and 96 are displayed in the three range bands 82, 84 and 86. The screen display obtains the location of items 88, 90, 92, 93, 94, 95 and 96 from periodic updates or from a communication network such as a wireless communication channel established between the screen display and a transmitter located at a base station, on a mobile platform, on an airborne platform, or from a satellite relay. Other dynamically obtained information such as the actual positions of various points of interest could be obtained via communication signals from the Global Positioning System (GPS) satellites.

Figure 5:
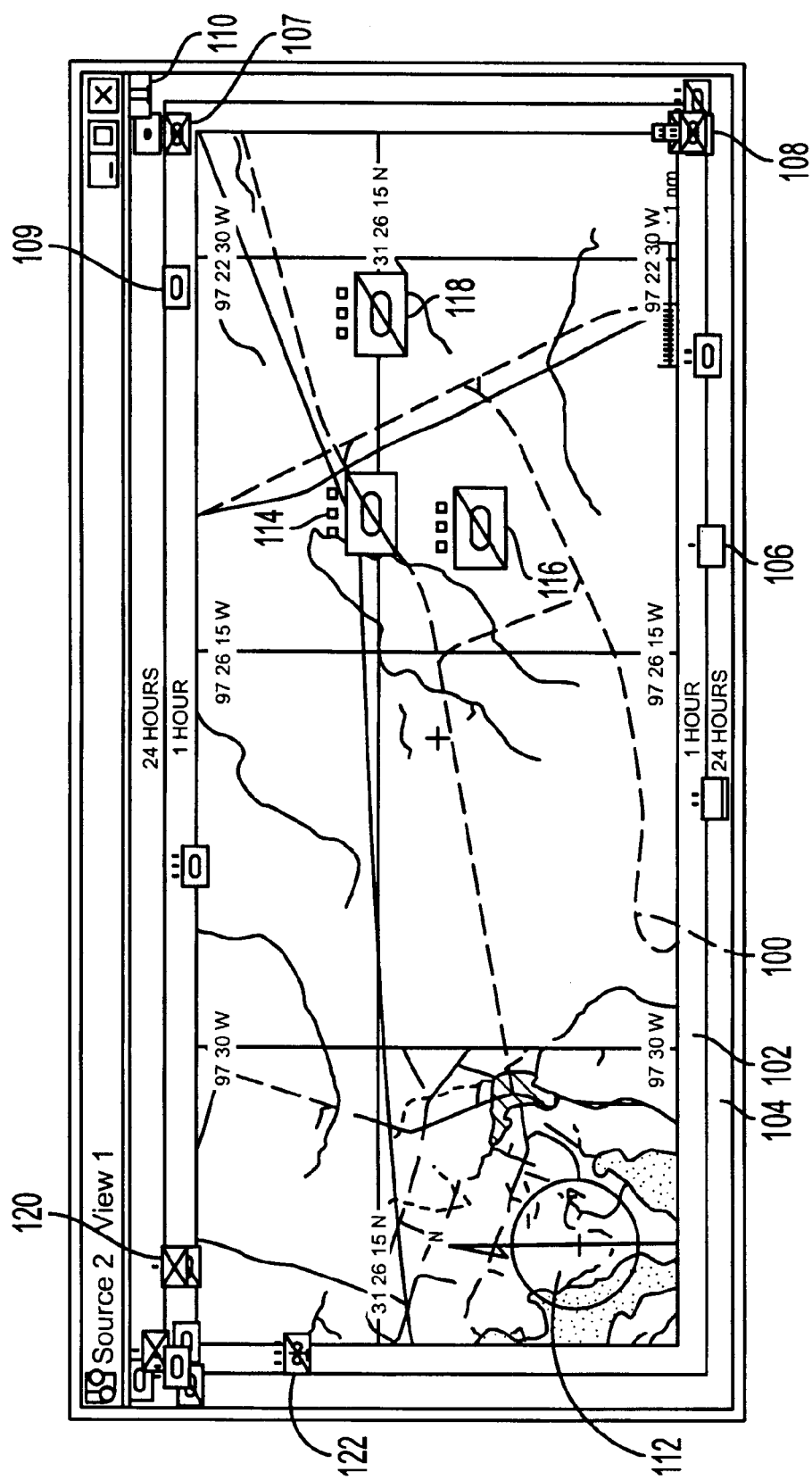
FIG. 5 illustrates a screen display of a map projecting multiple range bands spaced according to time intervals with points of interest displayed on the screen display.

FIG. 5 illustrates a screen display of a map projecting multiple range bands spaced according to time intervals with points of interest displayed on the screen display. The central map area 100 projects a map image of interest to a user. Two peripheral range bands 102 and 104 project items of interest outside the image projected in the central map area 100. In this illustration, the items of interest 106, 107, 108, 109, 110, 120 and 122 are projected on the display screen 112 in range bands 102 and 104 that are measured with respect to a time interval. The first range band 102 projects items of interest that are within a one hour time zone. For example, the display screen 112 shows combat units 114, 116 and 118. A combat unit commander might want to know all units that are capable of reaching his position within a one hour period of time. Those units located in the first range band 102 are 107, 108, 109, 120, and 122. The closest units to the combat unit commander's position are units 107, 108 and 109. Those units located in the second range band 104 such as units 110 are located within a two to twenty-four hour time frame. During a time of crisis, the combat unit commander can immediately obtain information regarding other units ability to assist in a timely fashion.

Figure 6:
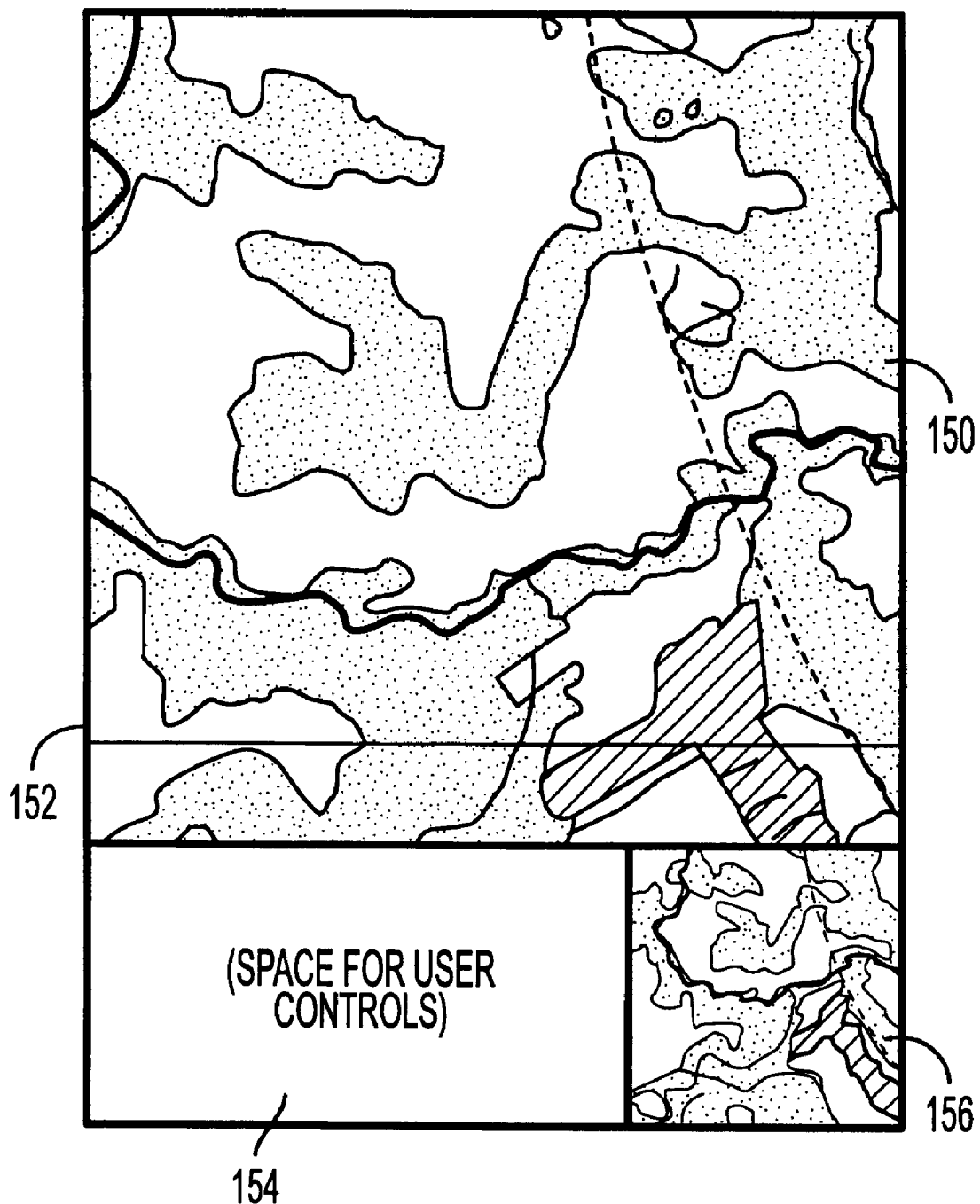
FIG. 6 illustrates a screen display with dual images at different map scales.

FIG. 6 illustrates a screen display with dual images. The central map area 150 is displayed at the top of the screen display 152. In the lower left hand area, a space 154 is provided for sensory touch input for receiving information from the user. The lower right hand area 156 displays a high level map including the surrounding areas outside the central map area 150. The touch input area 154 can support input mechanisms for the user to select the number of range bands and the dimension of the range bands (distance, time, velocity of points or items of interest), as well as other desirable information.

Figure 7:
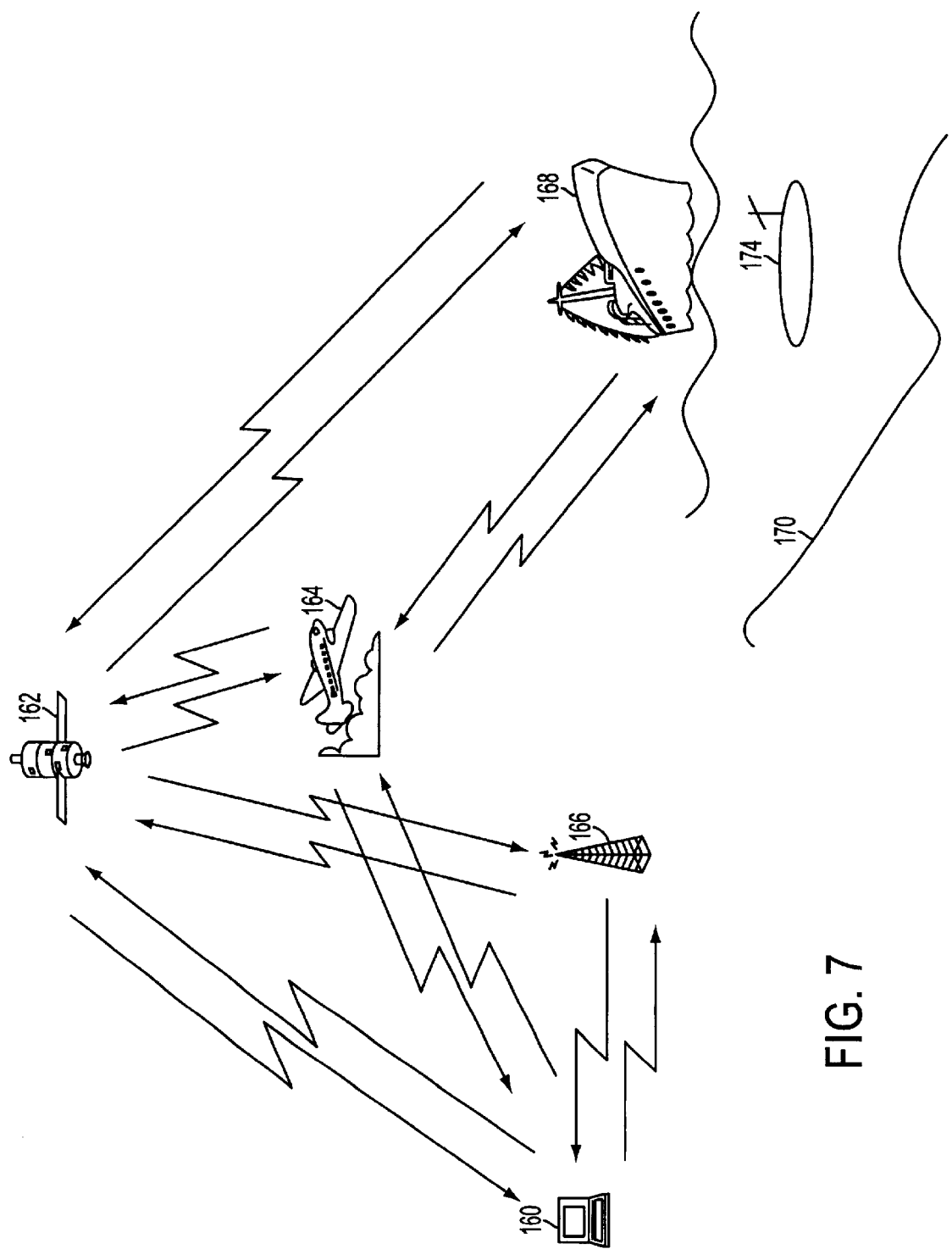
FIG. 7 illustrates a communication system for dynamically updating points of interest on the screen displays.

FIG. 7 illustrates a communication network system for dynamically updating points of interest on a plurality of screen displays. In many instances the screen display will be mounted on a moveable platform where the user will have the capability to select the center of the central map area to the location of the user and the central map area will move as the user moves. For example, the screen display could be mounted on a hand-held computer that is carried by a user, on a vehicle or a ship. The user might want to select a digital map image projecting a central map area thousands of miles away from the screen display. At other times, the user will want the center of the central map area to move. The movement of the central map area will require a supply of real time or almost real time data regarding the position of the center of the central map area as will as mobile items of interest.

FIG. 7 illustrates a screen display 160 receiving real time information from a satellite 162 or an aerial platform such as an Airborne Warning and Control System (AWACS) or a Joint Surveillance Target attack Radar System (JSTARS) 164. The AWACS system interface could provide real time aerial threats or resources for supporting air to ground attacks. The JSTARS system interface could provide information regarding the movement of friendly or enemy vehicles. In addition to receiving this information, the user also will need to supply information regarding its own position to these communications systems and to the headquarters 166 so that the user's position can be broadcast to other combat units.

An alternative embodiment includes locating the screen display on a ship 168 such as a vessel supporting the Surveillance Towed Array System (SURTASS). The information supplied to the screen display could include navigational chart information of the ocean bottom 170 so that the situational awareness of the ship 168 relative to shallow areas is displayed on the screen display. The location of enemy surface and subsurface threats 174 could be projected on the screen display located on the ship 168 or in small boats containing Special Forces personnel.

There are at least two general approaches for depicting situational awareness information using range bands. The first approach, uses a Cartesian coordinate projection to preserve the orthogonal relation between the central map area and the range bands. This algorithm has the disadvantage of not preserving the angle between the map center and the point of interest. For some calculations, this preservation of the angle can produce misleading calculations. The following algorithm supports a Cartesian projection of a point outside the central map area into peripheral range bands by:

1. Determining how far north (or south) the point of interest is from the edge of the central map area.
2. Comparing the distance from the point of interest to the central map edge with the width of the innermost range band.
3. If the distance is greater than the width of the inner most range band, go back to step 2 but use the next range band.
4. If the distance is within the width of the range band, subtract the cumulative width of all bands inside the current band from the distance between the point and the central map area, and divide the result by the width of the band to determine how far into the band the point lies.
5. Adding the pixel value of the edge of the central map area to the thickness of the bands inside the band containing the point and the fraction of the thickness of the band containing the point to determine the actual pixel value.
6. Repeating steps 1–5 to determine the east (or west) pixel value.

The second approach utilizes a bearing-preserving calculation to present situational awareness information within the range bands. This technique positions objects in range bands so that their angular relationship to the map center is preserved, ameliorating the problem of objects bunching up in the corners of the range bands that can occur when using the first approach. This second algorithm uses a bearing preserving projectin to display a point of interest outside the central map area into peripheral range bands by:

1. Determining the range and bearing from the center of the map to the point of interest.
2. Calculating the range from the center of the map to the map edge along that bearing.
3. If the range to the point of interest is less than the range to the map edge, the point of interest lies in the central map area.
4. If the range to the point is greater than or equal to the range to the map edge, determining the correct range band by successively adding range band widths to the range to the map edge until the sum is greater than the range to the point of interest.
5. Determining the depth of the point of interest within the appropriate range band by comparing the distance into the range band with the range band width.
6. Using the bearing value from step 1 and the known dimensions of the display area to determine which edge (top, bottom, left, or right) of the range band that the point of interest occupies.
7. Using the properties of similar triangles to determine the correct X and Y pixel offsets of the point of interest into the range band.

Figure 8:
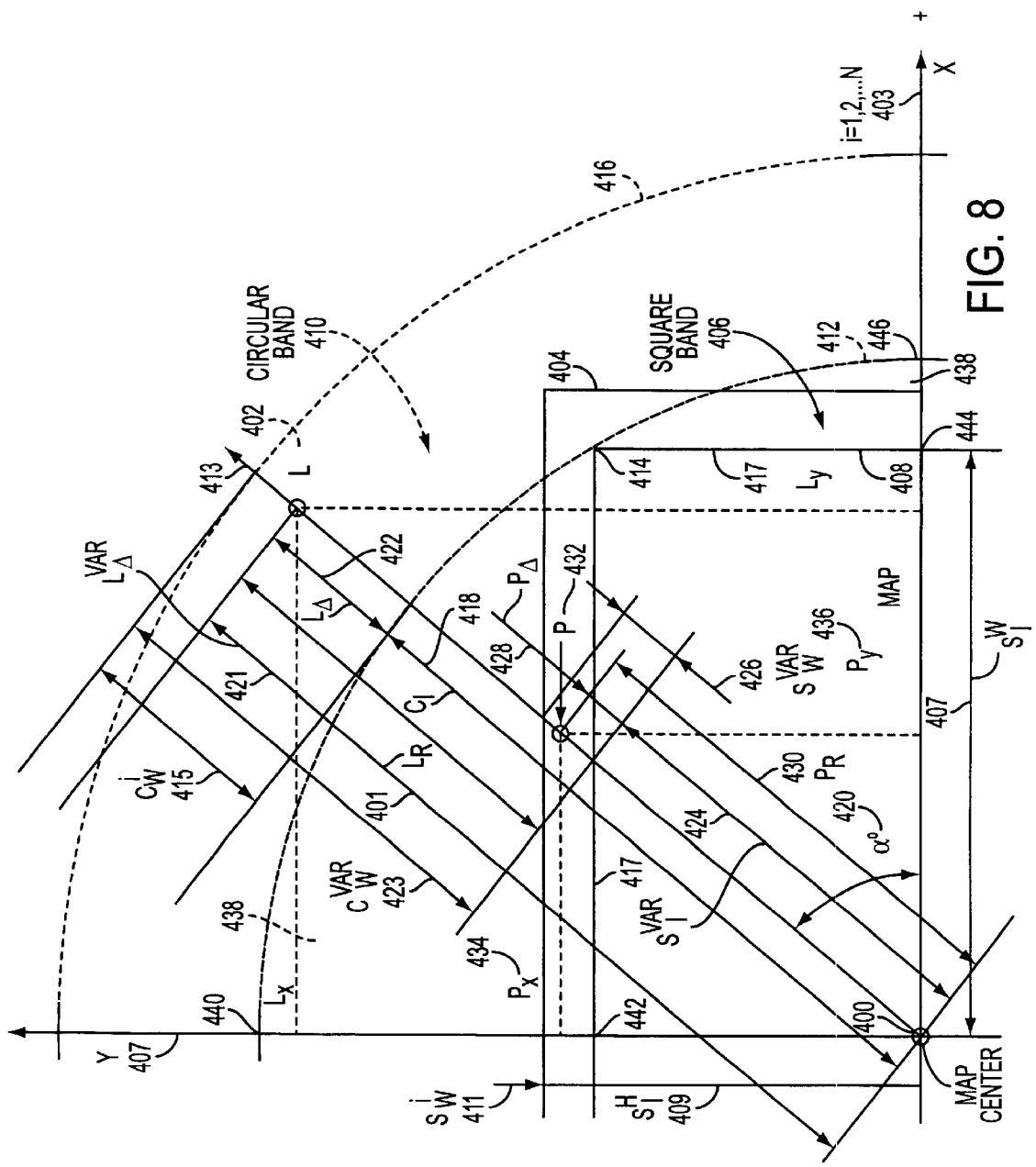
FIG. 8 illustrates the calculation and projection of a point of interest on a screen display using a single range band.

A summary of the variables and their respective descriptions is as follows:

L "Latitude/Longitude" point
$L_X$ X-coordinate of L point
$L_Y$ Y-coordinate of L point
P Pixel point
$P_X$ X-coordinate of P point
$P_Y$ Y-coordinate of P point
K Band # in which points is located
N Number of bands selected
$C_I$ Range from map center to the inner edge of the innermost circular band
$C_w^i$ Width of the "I"-th circular band (I=1, 2, ... N)
$S_I^H$ Range from map center to the horizontal edge of the innermost square band
$S_w^i$ Width of the "T"-th square band (I=1, 2 ... N)
α Angle between the line which connects given point with center of the map and X coordinate
$L_R$ Range from map center to the point of interest L
$L_A$ Radial range from the inner edge of the circular band to the L point
$L_{66}^{VAR}$ Radial range from the outer edge of the innermost square band to one L point.
$P_R$ Range from map center to the P point
$P_A$ Radial range from the inner edge of the square band to the P point
$C_w^{VAR}$ Radial range from the inner edge of the innermost square band to the outer edge of the innermost circular edge
$S_w^{VAR}$ Radial range from the inner edge of the innermost square band to the outer edge of the innermost circular edge
$S_I^{VAR}$ Radial range from map center to the inner edge of the innermost square band
$S_I^W$ Range from map center to the vertical inner edge of the innermost square band
i Index Variable
j Index Variable FIG. 8 illustrates the coordinate range points for calculating a map range band. A map center 400 is chosen on a particular map of interest. For simplicity, FIG. 8 illustrates the calculation of locations of interest in the quadrant defined by the positive x (403) axis and the positive y (405) axis. The location of a point of interest L (402) represents a point that is to be plotted. The inner display screen defined by $S_I^W$ (407) and $S_I^H$ (409) will show points of interest out to the outer edge 408 of the outer square band 406. The location of point L 402 lies off the display screen for the particular scale of the map shown on the display screen. Therefore, a range band 406 is provided on the screen display such that the specific scale of the map showing the map center 400 is maintained, while points of interest located in a circular band 410 are shown in the square band 406 bounded by the outer edge 404 of the square band 406 and the inner edge 408 of the square band 406. The square band 406 is the area located in $S_W^i$ (411) that will show the compressed area of the circular band 410.

The inner edge 412 of the circular band 410 touches the inner edge 408 of the square band at location 417. The thickness $C_w^i$ (415) of the circular band 410 (distance between the inner edge 412 and the outer edge 416 of the circular band 410) can be preset or user defined. Regardless of the thickness $C_w^i$ (415) of the circular band 410, the thickness will be mapped to the area inside the narrower square band 406.

The angle α (420) of the ray 413 is determined from the ray 413 that originates at the map center 400 and passes through the point of interest L (402) relative to the x coordinate 403 of the map center 400 and is calculated by:

$$\alpha = \arctan\left(\frac{L_y}{L_x}\right)$$

By knowing the map center 400 and the point of interest L (402), the distance $L_R$ (401) between the two points can be calculated by:

$$L_R = \frac{L_y}{\sin \alpha}$$

Also known is the distance between the map center 400 and the inner edge 412 of the circular band 406. This distance is denoted by $C_I$ (418). The distance between the point of interest L (402) and the inner edge 412 of the circular band 406, $L_\Delta$ (422) can be obtained by taking the difference between the distance from the map center 400 to the point of interest L (402) and $C_I$ (418). $L_\Delta$ (422) is the value for the distance inside the circular band 410 of L (402). $L_\Delta$ (422) can also be compared to the total thickness $C_w{}^i$ (415) of the circular band 410 producing a ratio for calculating the distance along the ray 413 passing through the map center 400 and the point of interest L (402). The ratio is the value of $L_\Delta{}^{VAR}$ (421) and $C_W{}^{VAR}$ (423). The distance along the ray 413 from the map center 400 to the inner edge 408 of the square band 406 is $S_I{}^{VAR}$ (424).

Also calculated is the length of portion of the ray 413 that falls within in the square band 406 at the particular angle $\alpha$ (420). This length is denoted as $S_W{}^{VAR}$ (426) and is multiplied by the ratio calculated from the distance along the ray 413 passing through the map center 400 and the point of interest L (402) to produce the value $P_\Delta$ (428). In this description, the map center 400 is the screen coordinate that is typically a pixel located in the center of the screen display area. Other embodiments might locate the screen coordinate in a location on the screen display at a pixel other than the center of the display screen area. It is this screen coordinate that is used for ploting the ray 413 from the screen coordinate to the point of interest P (432) on the display screen. For simplicity, the screen coordinate and the map center are given a common location 400. The value $P_\Delta$ (428) added to the value of $S_I{}^{VAR}$ (424) gives the distance $P_R$ (430) of the point P (432) from the map center 400 along the ray 413 within the square band (406). If the distance $P_R$ (430) is not located in the first circular range band, there is no need to compensate for a dead zone, thus $P_R$ (430) is calculated by:

$$P_R = \left(\left(L_R - C_I - \sum_{j=o}^{j=k-1} C_w^j\right)\frac{S_w^k}{C_w^k} + S_I^H + \sum_{j=o}^{j=k-1} S_w^j\right) * \frac{1}{\sin \alpha}$$

If the distance $P_R$ (430) is located in the first circular range band, there must be compensation for the dead zone, thus $P_R$ (430) is calculated by:

$$P_R = \left(\left(L_R - \frac{S_I^H}{\sin \alpha}\right) * \frac{S_w^1}{C_w^1 + C_I - \frac{S_I^H}{\sin \alpha}} + S_I^H\right) * \frac{1}{\sin \alpha}$$

By knowing the value $P_\Delta$ (428), the point of interest P (432) ran displayed in the square band 406 along the $P_X$ (434) and $P_Y$ (436) values. The value of $P_X$ (434) is calculated by:

$$P_X = P_R * \cos \alpha$$

The value of $P_Y$ (436) is calculated by:

$$P_Y = P_R \sin \alpha$$

A dead zone 438 exists and is located in the area defined by the difference in the area defined by the inner edge 412 of the circular band 410 and the area defined by $S_I{}^W$ (407) and $S_I{}^H$ (409). The value of $S_I{}^W$ (407) is calculated by:

$$S_I^W = C_I * \cos\left(\arcsin\left(\frac{S_I^H}{C_I}\right)\right)$$

The dead zone area is located in the area defined by the points 440, 442 and 414 and the area defined by the points 444, 446, and 414. In this dead zone 438, instead of just using the distance $C_w{}^i$ (415) of the circular band 410, the distance $C_w{}^i$ (415) must be added to the distance $C_W{}^{VAR}$ (423) which is the distance from the visible map area on the display to the outer edge 416 of the circular band 410. This distance will vary as $\alpha$ (420) changes. Angle $\alpha$ (420) can be determined by:

$$\alpha = \arctan\left(\frac{P_y}{P_x}\right)$$

The "dead zone" 438 computation is performed to compensate for the distance between the inner edge 408 of the square band at location 417 and the inner edge 412 of the circular band 410 where the point of interest L (402) is located. It is also possible to reverse the calculations and perform computations to move from point P (432) to point of interest L (402). These calculations are useful when the user desires additional information regarding distance and direction of the point of interest L (402) from the map center 400.

Figure 9:
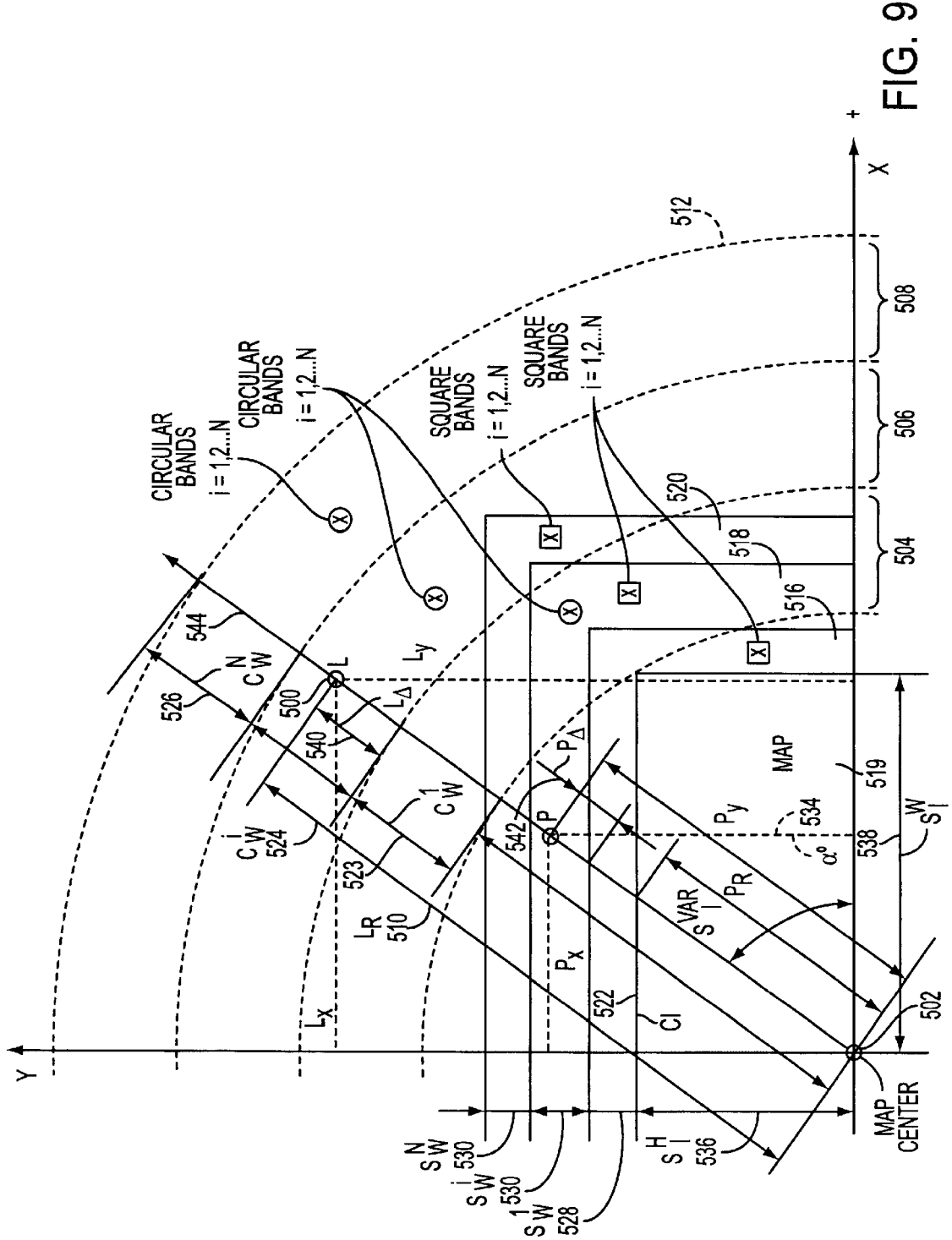
FIG. 9 illustrates the calculation and projection of a point of interest on a screen display using multiple range bands.

FIG. 9 illustrates the coordinate range points for calculating multiple map range bands. The first step is to calculate which circular band that the point of interest L (500) lies in. For points of interest that are located in the inner most range band 504, the calculations are the same as those described in FIG. 8. For points of location L (500) that are located in the second bands 506 through subsequent range bands 508, the distance $L_R$ (510) of the point of interest L (500) from the map center 502 is calculated to determine which circular band the point of interest L (500) is located in. This is accomplished by comparing $L_R$ (510) with the parameters of the inner and outer edges of the various range bands. If the point of interest L (500) is located outside the outer edge 512 of the last range band 508, then the point of interest L (500) cannot be displayed.

FIG. 9 illustrates a graphical representation of the information that would be displayed to the user as well as the information source. The user display would project the inner square band 514 and a plurality of additional square bands 516, 518 and 520. The information projected in the square bands 516, 518 and 520 would be generated from source information represented in the circular bands 504, 506 and 508, respectively.

For example, for the point of interest L (500), the distance $L_R$ (510) is calculated. This distance $L_R$ (510) is compared with the inner and outer edges of the circular bands 504, 506 and 508. By knowing the distance from the map center 502 to the inner edge of the first range band $C_I$ (522) as well as the distances of the range bands $C_w{}^I$ (524) through $C_w{}^n$ (526), a calculation of the particular range band encompassing the point of interest L (500) can be made. In FIG. 9, the point of interest L (500) is located in the second range band 506 or $C_w{}^2$.

The information or points of interest located in the circular range bands 504, 506, and 508 is compressed and displayed proportionally in the square bands 516, 518 and 520 according the proportions between the thickness of the circular range bands 504, 506 and 508 to the thickness of the square bands $S_w^1$ (528), $S_w^i$ (530) and $S_w^n$ (532), respectively. In FIG. 9, three circular bands $C_w^1$ (523), $C_w^i$ (524) and $C_w^n$ (526) are represented. Therefore, $C_w^i$ (524) corresponds to $C_w^2$ (524) and $C_w^n$ (526) corresponds to $C_w^3$ (526). Also, FIG. 9 illustrates the three circular range bands with equal thickness. This does not need to be the case and a typical display will project increasing thickness of the circular range band as the number of square bands $C_w^n$ (526) increase. As an example, the inner square display might be at a scale of 1:10, while the first square band 504 might be projected at a scale of 1:100, the second square band projected at a scale of 1:1000 and the third square band projected at a scale of 1:10000.

To project the point of interest L (500) as point P in the square band 518, the distance $L_R$ (510) is determined at the angle α (534). The various scales of the inner display 514 bounded by the height $S_H^I$ (536) and the width $S_W^I$ (538) is either predefined or user determined on a dynamic basis, based on the requirements of the user. These requirements in many instances can change as the user's need for more or less precise information is required.

The ratio of the distance $L_A$ (540) of the point of interest L (500) from the inner edge of the circular range band 506 to the distance $C_w^i$ (524) of the circular range band 506 is used to calculate the distance $P_A$ (542) along ray 544 in the square band 518 along angle α (534).

Figure 10:
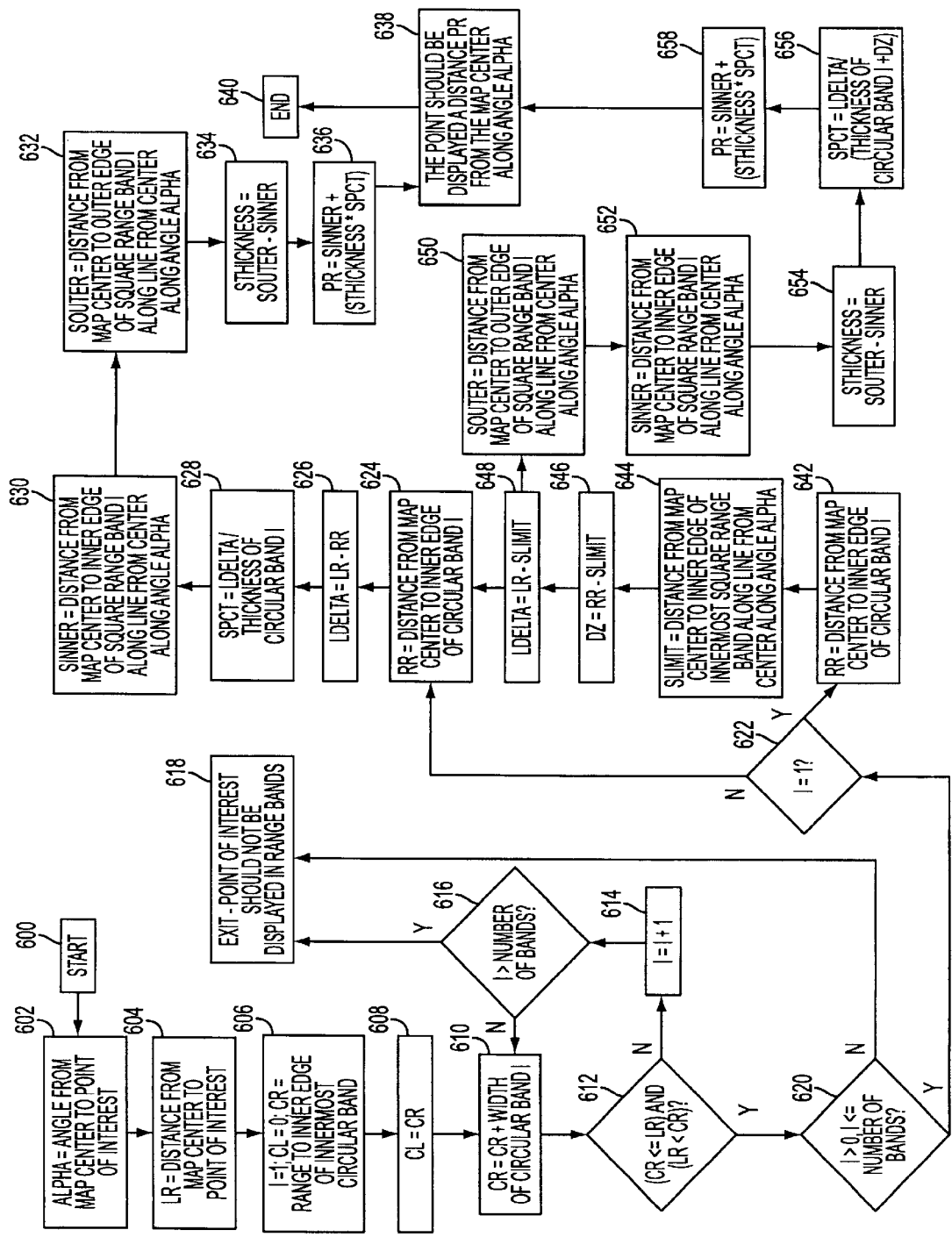
FIG. 10 illustrates a flow chart of the algorithm.

FIG. 10 illustrates a flow chart of the algorithms used to project the situational awareness displays. From the start box 600, the angle α of the ray from the map center to the point of location L 602 is calculated. The distance from the map center to the point of interest is calculated 604 and the algorithm sets in box (606) I=1 (this will keep track of the circular range band), CL=0 (dummy variable to perform comparison) and CR=the range to the circular band to be tested. In box 608 CL is set equal to CR. In box 610, CR is set equal to the value of CR plus the width of the circular band containing the point of interest.

The algorithm tests 612 whether the distance from the map center is less than or equal to the value of CR. If not, the value of I in box 614 is incremented by one and the algorithm tests 616 whether the value of I is greater than the number of range bands. If the test 616 is affirmative, the algorithm exits 618 and cannot display the point of interest L on the display. If the test 616 is negative, the algorithm adds another value of the distance representing the next circular range band CR 610.

When the algorithm obtains a value of LR greater than or equal to CR from box 612, the algorithm tests 620 whether the value of I is greater than 0 or the number of range bands is greater than or equal to one. If these two values are not achieved, then the algorithm exits 618 and cannot display the point of interest L on the display. If the values from box 620 are obtained, then the algorithm tests 622 whether I is equal to one.

The test in box 622 determines whether the point of interest L is located in the first circular range band. If the point of interest is located in the first circular range band, then the algorithm must account for the "dead zone." If the point of interest L is not in the first circular range band, then $R_R$ is set equal 624 to the distance from the map center to the inner edge of the circular range band I.

$L_A$ is set equal 626 to the distance from the map center minus the distance from the map center to the inner edge of the circular range band I. The value of $L_A$ 626 represents the distance the point of interest L is located within the circular range band of interest along a ray from the map center at the angle α. The value of Spct is the percentage distance of the point of interest inside the circular band of interest and is calculated 628 by dividing $L_A$ by the thickness of the circular range band I.

The distance 630 is calculated from the map center to the inner edge of the square range band I along the ray from the map center at the angle α. The distance 632 is then calculated from the map center to the outer edge of the square range band I along the ray from the map center at the angle α. The thickness 634 of the square range band along the ray from the map center to the point of interest along the angle α is calculated from the difference is the value calculated in box 632 and 630, respectively.

The distance 636 from the map center to the location inside the square range band of the point of interest L is obtained from adding the distance 630 from the map center to the inner edge of the square range band I along the ray from the map center at the angle α with the value of the thickness 634 of the square range band multiplied by the percentage value obtained in box 628. The point of interest L is then plotted 638 on the user display a distance from the map center along the angle α and the algorithm ends 640.

Returning to box 622, if the point of interest L is located in the first circular range band or a circular range band and correction for the "dead zone" must be calculated. The distance 642 from the map center to the inner edge of the circular range band I. The algorithm then calculates 644 the distance from the map center to the inner edge of the innermost square range band along the ray from the map center to the point of interest L at the angle α. The "dead zone" is compensated by the difference 646 between the distance 642 from the map center to the inner edge of the circular range band I and the distance 644 from the map center to the inner edge of the innermost square range band along the ray from the map center to the point of interest L at the angle α. The value of $L_A$ is calculated from the difference 648 in the distance 604 from the map center to the point of interest and the distance 644 from the map center to the inner edge of the innermost square range band along the ray from the map center to the point of interest L at the angle α.

The distance 650 is then calculated from the map center to the outer edge of the square range band I along the ray from the map center at the angle α. Next, the distance 652 is calculated from the map center to the inner edge of the square range band I along the ray from the map center at the angle α. The thickness 654 of the square range band along the ray from the map center to the point of interest alone the angle a is calculated from the difference is the value calculated in box 650 and 652, respectively. The value of Spct in box 656 (the percentage value of the point of interest inside the circular band of interest) is calculated by dividing $L_A$ by the thickness of the circular range band I plus the amount of the "dead zone" calculated in box 646.

The distance 658 from the map center to the location inside the square range band of the point of interest L is obtained from adding the distance 654 from the map center to the inner edge of the square range band I, along the ray from the map center at the angle α, with the value of the thickness 654 of the square range band multiplied by the percentage value obtained in box 656. The point of interest L is then plotted 638 on the user display a distance from the map center along the angle α and the algorithm ends 640.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

What is claimed is:

1. A method for displaying situational awareness information, comprising:

selecting a map center coordinate;

determining an angle between an axis passing through the map center coordinate and a first ray beginning at the map center coordinate and passing through a point of interest;

determining a distance between the map center coordinate and the point of interest;

selecting a circular range band with an inner and an outer edge as well as a thickness;

determining if the point of interest is located between the inner and the outer edge of the circular range band, and if so, determining a ratio of the distance along the ray that the point of interest lies with respect to the thickness of the circular range band;

selecting an area for projecting on a screen display having a screen coordinate; and selecting a display band having a thickness that is projected on the screen display such that the point of interest located in the circular range band is projected on the screen display within the display band along a second ray extending from the screen coordinate at the angle and located within the display band with the ratio relative to the thickness of the display band.

2. The method for displaying situational awareness information of claim 1, where the screen coordinate moves relative to an underlying image on the screen display.

3. The method for displaying situational awareness information of claim 1, where the point of interest moves relative to the screen coordinate.

4. The method for displaying situational awareness information of claim 1, where the projection of the point of interest on the screen display compensates for a dead zone.

5. The method for displaying situational awareness information of claim 1, where a plurality of the points of interest are projected independently of each other on the display screen.

6. A method for displaying situational awareness information, comprising:

selecting a map center coordinate where a first image is projected on a display screen;

selecting a first scale for projecting situational awareness information in the first image;

selecting at least one circular range band having inner and outer edges and a thickness such that the map center coordinate acts as a center for the at least one circular range band;

determining at least one point of interest;

determining an angle between an axis passing through the map center coordinate and a first ray beginning at the map center coordinate and passing through the at least one point of interest;

determining a distance between the map center coordinate and the point of interest;

determining if the point of interest is located between the inner and the outer edge of the at least one circular range band, and if so, determining for which of the at least one circular range band the at least one point of interest is located within the inner and outer edge;

determining a ratio of the distance along the first ray that extends from the map center coordinate through the at least one point of interest from the inner edge of the at least one circular range band to the at least one point of interest with respect to the thickness of the circular range band;

selecting at least one display band corresponding to the number of the at least one circular range band on a screen display having a screen coordinate; and the at least one display band having a thickness that is projected on the screen display such that the point of interest located in the circular range band is projected on the screen display within the at least one display band along a second ray extending from the screen coordinate through the at least one point of interest and the angle and within the at least one display band according to the ratio.

7. The method for displaying situational awareness information of claim 6, where the first image displayed on the screen display moves relative to the screen coordinate.

8. The method for displaying situational awareness information of claim 6, where the screen coordinate moves relative to an underlying image on the screen display.

9. The method for displaying situational awareness information of claim 6, where if the at least one point of interest is located within the inner and outer edge of a first of the at least one circular range band, a dead zone is compensated for when the at least one point of interest is projected on a first of the at least one display band.

10. The method for displaying situational awareness information of claim 6, further comprising receiving the at least one point of interest from at least one wireless source such that as the at least one point of interest changes position relative to the map center coordinate the positional change is transmitted to the screen display.

11. A method for displaying situational awareness information, comprising:

selecting a map center coordinate where a first image is projected on a display screen;

selecting a first scale for projecting situational awareness information in the first image;

selecting a first circular range band having inner and outer edges and a thickness such that the map center coordinate acts as a center for the first circular range band;

selecting at least one additional circular range band having inner and outer edges and a thickness such that the map center coordinate acts as a center for the at least one additional circular range band;

determining at least one point of interest;

determining an angle between an axis passing through the map center coordinate and a ray beginning at the map center coordinate and passing through the at least one point of interest;

determining a distance between the map center coordinate and the point of interest;

determining if the point of interest is located between the inner and the outer edge of the first circular range band, and if so, compensating for a dead zone, and determining a ratio of the distance along the ray that extends from the map center coordinate through the at least one point of interest from the inner edge of the first circular range band to the at least one point of interest with respect to the thickness of the circular range band;

determining if the point of interest is located between the inner and the outer edge of the at least one additional circular range band, and if so, determining a ratio of the distance along the ray that extends from the map center coordinate through the at least one point of interest from the inner edge of the first circular range band to the at least one point of interest with respect to the thickness of the circular range band;

selecting a first display band corresponding to the first circular range band;

selecting additional display bands corresponding to the number of the at least one additional circular range bands;

if the point of interest is located in the first circular range band, locating the point of interest in the first display band on the screen display such that the point of Interest is projected on the screen display along a ray extending from a screen coordinate to the point of interest within the first display band according to the ratio and the compensation for the dead zone; and if the point of interest is located in the at least one additional circular range band, locating the point of interest in the appropriate additional display band corresponding to the at least one additional circular range band such that the point of interest is projected on the screen display along a ray extending from the screen coordinate to the point of interest within the at least one additional display band according to the ratio.

12. The method for displaying situational awareness information of claim 11, where the first image displayed on the screen display moves relative to the screen coordinate.

13. The method for displaying situational awareness information of claim 11, where the screen coordinate moves relative to an underlying image on the screen display.

14. The method for displaying situational awareness information of claim 11, further comprising receiving the at least one point of interest from at least one wireless source such that as the at least one point of interest changes position relative to the screen coordinate, the positional change is transmitted to the screen display.

15. An apparatus for projecting situational awareness information to a user, comprising:

a microprocessor connected to a memory area where the memory area is capable of storing situational awareness information data;

a screen display connected to the microprocessor, where the screen display is capable of projecting a plurality of images from the situational awareness information data and displaying the images in discrete locations on the screen display;

the screen display also being capable of projecting in at least one location of the screen display a first image representing a first scale and having an outer edge, and a second image representing a second scale and having an inner edge image projected along the peripheral area of the outer edge of the first image in a display band, and where the second image is projected with a different scale relative to the first image; and the screen display further being capable of projecting a point of interest proportionally in the display band corresponding to the point of interest's location relative to its proportional distance from the map center coordinate.

16. The apparatus for projecting situational awareness information to the user, according to claim 15, where the scale of the first image and the scale of the second image is based on the relative velocity of the movement of the map center coordinate and the movement of the point of interest.

17. The apparatus for projecting situational awareness information to the user, according to claim 15, where the scale of the first image and the scale of the second image is based on a map distance.

18. The apparatus for projecting situational awareness information to the user, according to claim 17, where the scale of the first image and the scale of the second image is based on time.

19. The apparatus for projecting situational awareness information to the user, according to claim 15, where the situational awareness data comprises global positioning system data.

20. The apparatus for projecting situational awareness information to the user, according to claim 19, where the global positioning system data allows the map center coordinate to move relative to the first image projected on the screen display.

21. The apparatus for projecting situational awareness information to the user, according to claim 15, further comprising a receiver connected to the microprocessor such that the situational awareness data is transmitted to and received by the receiver.

22. The apparatus for projecting situational awareness information to the user, according to claim 19, where the situational awareness data comprises information received from airborne transmitter platforms.

23. The apparatus for projecting situational awareness information to the user, according to claim 19, where the situational awareness data comprises information received from ground transmitter stations.

24. The apparatus for projecting situational awareness information to the user, according to claim 19, where the situational awareness data comprises information received from returns from active sonar signals.

25. The apparatus for projecting situational awareness information to the user, according to claim 19, where the situational awareness data comprises information received from returns from passive sonar signals.

* * * * *